US008923470B2

United States Patent
Convert et al.

(10) Patent No.: US 8,923,470 B2
(45) Date of Patent: Dec. 30, 2014

(54) CONTAINER FOR PACKAGING NUCLEAR WASTE WITH FORCE-FITTED LID

(75) Inventors: Bruno Convert, Nantes (FR); Thierry Favre, Nantes (FR); Jean Hericourt, Montigny le Bretonneux (FR); Arnauld Deniau, Les Pieux (FR); Pascal Pierre, Equeurdreville (FR); Badia Amekraz, Villiers le Bacle (FR)

(73) Assignee: Areva NC, Paris (FR)

( * ) Notice: Subject to any disclaimer, the term of this patent is extended or adjusted under 35 U.S.C. 154(b) by 875 days.

(21) Appl. No.: 12/994,449

(22) PCT Filed: May 27, 2009

(86) PCT No.: PCT/EP2009/056481
§ 371 (c)(1),
(2), (4) Date: Nov. 23, 2010

(87) PCT Pub. No.: WO2009/144256
PCT Pub. Date: Dec. 3, 2009

(65) Prior Publication Data
US 2011/0077449 A1 Mar. 31, 2011

(30) Foreign Application Priority Data
May 27, 2008 (FR) ...................................... 08 02870

(51) Int. Cl.
*G21C 3/00* (2006.01)
*F16J 13/12* (2006.01)
*G21F 5/12* (2006.01)
*G21F 5/00* (2006.01)
*B65D 41/16* (2006.01)
*B65D 41/10* (2006.01)
*B65D 41/02* (2006.01)

(52) U.S. Cl.
CPC ............. *G21F 5/12* (2013.01); *G21Y 2002/303* (2013.01); *F16J 13/12* (2013.01); *G21Y 2002/60* (2013.01); *B65D 41/16* (2013.01); *G21Y 2002/206* (2013.01); *G21Y 2004/30* (2013.01); *B65D 41/10* (2013.01); *B65D 41/026* (2013.01)
USPC ...................................... 376/409; 205/506.1

(58) Field of Classification Search
CPC ...... B65D 41/026; B65D 41/16; B65D 41/10; G21F 5/12; G21Y 2004/30; F16J 13/12
USPC ............................................................ 376/409
See application file for complete search history.

(56) References Cited

U.S. PATENT DOCUMENTS

| 192,358 | A | * | 6/1877 | Budel ........................... 220/620 |
| 2,948,959 | A | | 8/1960 | Bowes |
| 3,450,298 | A | | 6/1969 | Strohmeier et al. |
| 4,245,754 | A | | 1/1981 | Ellis |
| 4,708,258 | A | | 11/1987 | Shaw et al. |
| 5,180,076 | A | | 1/1993 | Hundt |

FOREIGN PATENT DOCUMENTS

| EP | 0061400 | A1 | | 9/1982 |
| EP | 0101362 | | * | 2/1984 |
| EP | 0101362 | A1 | | 2/1984 |
| FR | 2074745 | A | | 10/1971 |

OTHER PUBLICATIONS

International Search Report in International Application No. PCT/EP2009/056481, mailed Oct. 6, 2009.
Written Opinion in International Application No. PCT/EP2009/056481, mailed Oct. 6, 2009.

* cited by examiner

*Primary Examiner* — Frank J McGue
(74) *Attorney, Agent, or Firm* — Nixon Peabody LLP

(57) ABSTRACT

The container is comprised of a side wall of which the end edges are each provided with a blocking member, of which at least one is inserted in order to close an opening. The peripheral outline of the inserted blocking member and the interior outline of the associated end edge of the side wall have generally complementary shapes on at least one portion of their respective heights, in such a way that said inserted blocking member comes to be housed on at least one portion of its height in the space defined by said end edge of the side wall and comes to bear against said end edge by adjusting lugs in recesses of complementary shape. The inclined joining surfaces form an angle from 20° to 40° with the axis of the container.

15 Claims, 4 Drawing Sheets

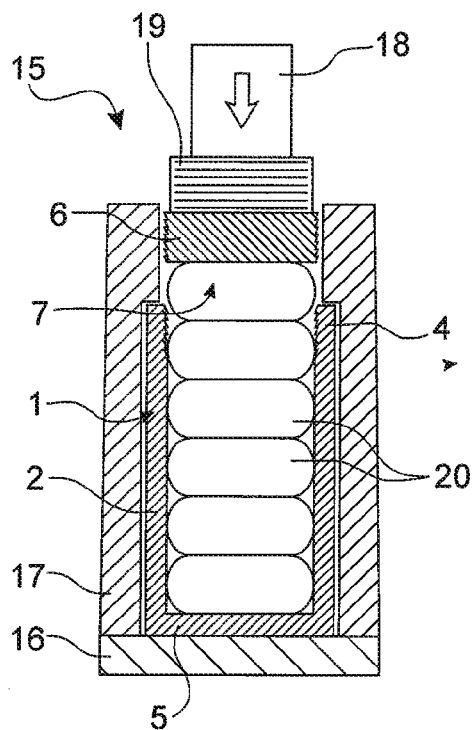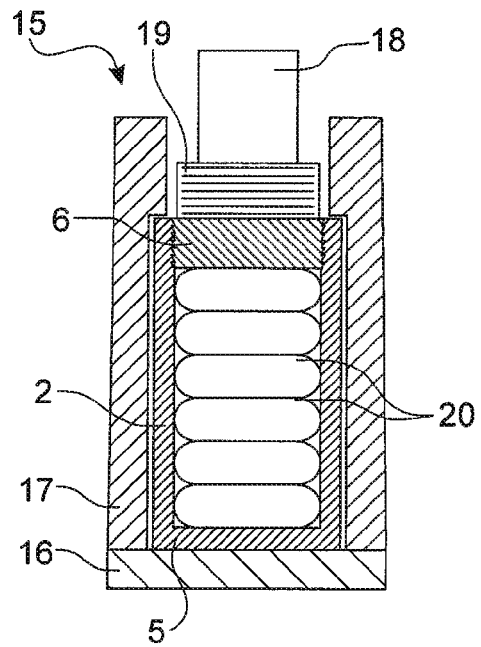
FIG.4A  FIG.4B
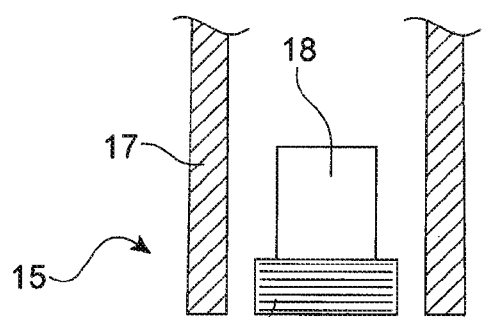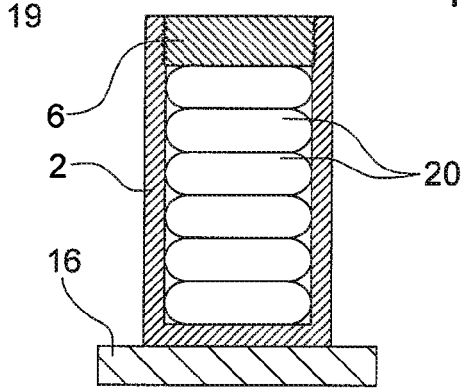
FIG.4C

CONTAINER FOR PACKAGING NUCLEAR WASTE WITH FORCE-FITTED LID

CROSS REFERENCE TO RELATED APPLICATIONS OR PRIORITY CLAIM

This application is a National Phase of PCT/EP2009/056481, filed May 27, 2009, entitled, "CONTAINER FOR PACKAGING NUCLEAR WASTE WITH FORCE-FITTED LID A FORCE", and claims priority of French Patent Application No. 08 02870, filed May 27, 2008.

The invention relates to a container for packaging for storage or disposal as well as a method of confining products in such a container with force-fitted lid.

Interest here is given to a container that is particularly suited to the storage of dangerous waste, temporarily or during a very long period of time. The invention shall be more particularly described in the context of solid nuclear waste wherein it was first developed, but it is not limited to this field, the nature of the waste or of other products contained normally not being critical. It can be considered to use the invention with a marked interest for dangerous products, or any such radioactive, explosive, toxic, etc. products.

The nuclear industry has two main methods for storing waste. In the first, waste is placed in metal drums, and may be compressed, then poured into a cylindrical metal container with a cement-based matrix which ensures the radiological confinement. The seal of the container is guaranteed by placing a lid provided with a seal on its opening, then this lid is bolted. In the second method, the waste, still packed in drums, is arranged in fibrous concrete cylindrical containers then liquid fibrous concrete is injected into the container in order to block the drums without using a lid. A metal plate prevents the rising of the waste during the injection.

The nuclear industry also has containers of which the lids are retained either via a binding of smooth surfaces (EP-A-0 061 400), or via a nesting of forms in relief (EP-A-0 101 362). The assembly is carried out by hot press fitting, contactless. These methods of assembly are poorly suited to situations wherein a compression of the contents is required in addition to a safe blocking. These also require a material that is more abundant for heating or cooling one of the parts.

It is sought to reduce the volume required for the storage and disposal of this waste. The preliminary compression of it produces a compaction that is favourable to this result, but it has the disadvantage that compressed waste has a tendency to dilate again and exert stresses which can be substantial in the containers and the matrix. This is aggravated by releases of gas produced by radiolysis, which exert an overpressure in the container. Some of these gases are also corrosive and are likely to produce damage having an impact on the safety of the storage in the long term. It is therefore difficult to get the best out of the possibilities offered by compression and compaction, and notable empty volumes must be provided in the containers in order to reduce their internal stress.

The invention relates to an improved container for packaging which has the faculty of resisting substantial forces of dilatation of the products contained, consecutive to their compression, while still allowing for an easy method of packaging. This container can also favourably resolve the difficulties linked to the releases of gas.

In a general form, the invention relates to a container in the form of a drum for the stabilisation and the confinement of products such as radioactive waste, of which container is comprised of a side wall having lower and upper end edges each provided with a blocking member, at least one of said two blocking members being of the inserted type (originally separate from the container) in order to close an opening defined by the associated end edge, said inserted blocking member comprising two faces, one interior and the other exterior, connected by a peripheral outline, peripheral outline of the inserted blocking member and an interior outline of the associated end edge of the side wall having generally complementary shapes on at least one portion of their respective heights, in such a way that said inserted blocking member comes to be housed on at least one portion of its height in a space surrounded by said end edge of the side wall of the side wall and comes to bear against said end edge, characterised in that peripheral outline of the inserted blocking member is provided with at least one protruding lug and extending over its circumference, which has a section of generally triangular shape formed of an inclined surface, directed towards the interior face with an inclination such that said inclined surface moves away from a central axis of said blocking member 6 in a direction from the interior face to the exterior face according to an angle between 20° and 40° in relation to said axis, followed by a surface forming a flat, directed towards the exterior face, and in that the interior outline of the end edge of the side wall has at least one recess extending also over its circumference, able to receive said lug in order to ensure a locking of said inserted blocking member on said side wall, recess having a section comprising an inclined surface, directed towards the exterior of the container with an inclination such that said inclined surface moves away from a central axis of said side wall in an interior towards the exterior direction according to an angle between 20° and 40° in relation to said axis, followed by a surface forming a shoulder, directed towards the interior of the container.

A closing is therefore carried out by nesting forms between the main portion of the container and its blocking member (lid).

The essential aspect of the invention is in the particular profile of the lugs and of the recesses that are nesting, which makes it possible to resist the substantial internal pressures when the container is closed and also allows for easy insertion, i.e. with a force corresponding to a much lower pressure, of the lid in the orifice of the side wall of the container. It then becomes possible, and without any difficulty, to carry out the closing of the lid and as well as the compression of the waste via a single operation of pressing. For example, in an application actually considered, a pressing force of 180 tonnes can be used, of which 150 tonnes to compress the waste and 30 tonnes in order to ensure the closing of the lid; once closed, the container of this example can resist a pulling-off force of the lid corresponding to 300 tonnes which corresponds to a doubling of the initial internal pressure of the waste. The large difference between the forces required to close the container through nesting shapes and to open it by pulling off the lid thus make it possible to strongly compress the waste while still benefitting from a substantial degree of safety.

This advantage is owed to the particular profile of the lugs and of the recesses nesting into one another, and more particularly to their high conicity (the angle between 20° and 40°). This high conicity results in a wide abutment surfaces (the flats and the shoulders) between the side wall and the lid, which oppose the pulling off of the latter, while still retaining a faculty of elastic deformation which allows them to yield without excessive forces at the time of the driving down of the lid. Note that patent EP A 0 101 362, apparently the closest to the invention, describes conicities from 1° to 2° which do not seem to have the same properties. It must also be underlined that the link between the lid and the main portion of the container is provided by a hot press fitting in this patent of prior art, i.e. by dilating the side wall (or, in an equivalent manner, by cooling the lid) in such a way as to allow for an insertion of the lid without any solid contact. As no effort is exerted, this method is at first view not compatible with the creation of an effort to compress waste. Although it is specified that the container has a sufficient resistance to the pulling off, it is not certain that it is equivalent to that of the container of the invention, or that a closing by force fitting is possible.

The force fittings can be accomplished easily with a simple machine in a glove box. They guarantee a high degree of resistance to the pulling off. The section of containers is of any type but it is analogous to that of the drums of waste that are compressed therein.

The only function that the container must accomplish is therefore the resistance to the mechanical stresses. It is not necessary that it be sealed, even less than excessive releases of gas would increase the risks of pulling-off, despite the previous remarks. We shall then describe how the consequences of releases of gas outside of the container can be advantageously fought. The container can however absorb the corrosive releases, in particular chlorinated, if it is constructed from simple steel (black steel), since it undergoes corrosion: it therefore retains these dangerous products at a price of a minimal reduction in its resistance.

The recesses and the lugs are advantageously defined by two highly dissymmetric surfaces, where the surface forming a flat of the protruding lug of the inserted blocking extends in a plane perpendicular to the axis of said blocking member and the surface forming a shoulder of the complementary recess of the end edge of the side wall extends in a plane perpendicular to the axis of the side wall: the stop opposing the pulling off of the lid is then particularly effective.

In a preferred embodiment of the invention, the container however comprises a plurality of said lugs and a plurality of said recesses, the lugs and the recesses being superimposed in the direction of the axis of the blocking member or of the axis of the side wall. This arrangement makes it possible to increase the resistance to the pulling off without excessively increasing the resistance to the fitting, on the one hand thanks to the multiplication of the abutment surfaces, on the other hand thanks to the maintaining of reliefs with small dimensions, which can be deformed without exerting excessive forces.

The facility of fitting is further increased if the complementary outlines of the inserted blocking member and of the side wall are of generally complementary tapered shapes over at least one portion of their respective heights, said tapered portion of the blocking member diverging in the direction from the interior face to the exterior face and said tapered portion of the side wall diverging in the direction from the interior to the exterior of the container, the lugs having peripheral ridges with different increasing radiuses from the interior face to the exterior face, and the recesses are separated by interior outlines also of different radiuses, increasing from the interior to the exterior of the container; and even further if the radiuses of some of the interior outlines are larger than the radiuses of some of the ridges of the lugs; the radiuses of the interior outlines and those of the peripheral ridges can be successively increasing at a rate of 20% to 50% of the widths of the flats and of the shoulders. This arrangement makes it possible to obtain a progressive association of the lugs and of the recesses, by creating nesting depths that are increasingly large inside one another, which makes it possible to progressively apply the fitting force, to better guide the lid of which the opening of the main wall and to reduce the risks of premature wedging of the lid.

The fitting is also made easier if the lugs are adjoining in relation to one another and also if the interior outlines separating the recesses in the main wall are narrow, since the reliefs are then less massive and can be deformed more easily during fitting.

Another measure that is able to favour fitting consists in manufacturing the inclined surface of the lug with a hardness that is higher than the surface of the recess, in order to allow it to slide more easily with less deformation.

The invention also relates to a method for stabilising and confining products such as solid radioactive waste (in particular in the form of a superposition of compressed cakes), in a container such as defined hereinabove. This particular method consists:

in filling the container via its filling opening, with said solid radioactive waste, in inserting an adapted blocking member in front of said filling opening, in applying a compression force on said products by exerting a force on said inserted blocking member, concentrically to the side wall and in the direction of its other blocking member, until the complementary outlines of said inserted blocking member and of the side wall bear against one another, in such a way as to compress said products and to ensure the passive locking of said inserted blocking member on said side wall by the nesting of their means for linking.

As such, this method provides a compression of the products contained in a convenient manner, simultaneously to the closing of the lid by exerting a substantial compression force. The containers are sufficiently sized to undergo substantial compressions without fearing the consequences of dilatations of the products contained.

The force is applied on the inserted blocking member in such a way as to ensure the cooperation of the lug(s) and of the recess(es), by forced nesting, the end edge of the side wall being deformed during the positioning of said blocking member.

According to another additional characteristic, prior to its positioning, the inserted blocking member has a general shape of a cup, its dome being directed towards the side of its interior face; once inserted, this blocking member then undergoes a straightening and deformation phenomenon towards a shape, flat, under the thrust force exerted by the disposed products, causing an increase in the diameter of its peripheral outline and optimising the lug(s)-recess cooperation.

As such as has been mentioned, an advantage can be drawn from the circumstance that an imperfect seal exists between the lid and the side wall to authorise the degassing of the container. It can however be preferred to better control this degassing, by sealing the blocking member to the side wall, the blocking member then being crossed by a gas-permeable breathing pellet; the degassing is then done by this pellet with known characteristics.

It is then provided to place the container, or a group of these containers, inside an external container in order to reinforce the radiological confinement. The external container is not subjected to the forces exerted by the waste; it is the internal container, which undergoes the expansion forces of the waste without risking a deformation. The external container is dimensioned to resist racking and load drop constraints. The internal containers are placed with little play in the external container, which maintains the advantage of the small of amount of space for this storage mode. In order to avoid overpressures linked to any release of gases, the external container must be gas-permeable.

The invention shall be further illustrated, but without being limited, by the following description of possible embodiments, provided solely by way of example, and shown on the annexed drawings wherein:

FIG. 4 shows the main steps of a possible kinematics for the positioning of the blocking lid, on the upper opening and for the filling of the container;

Figure 7:
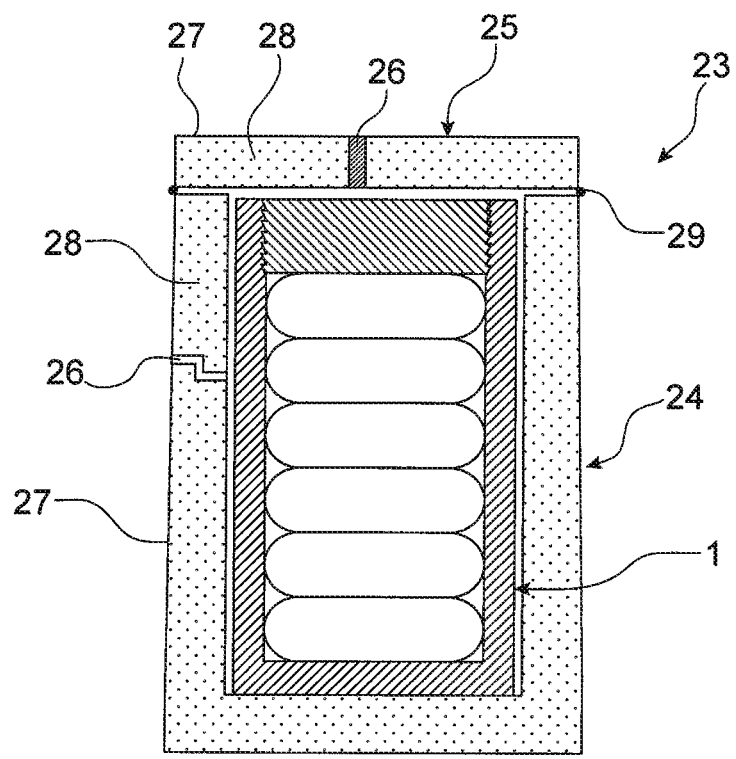

and FIG. 7 shows the use of an external container.

Figure 1:
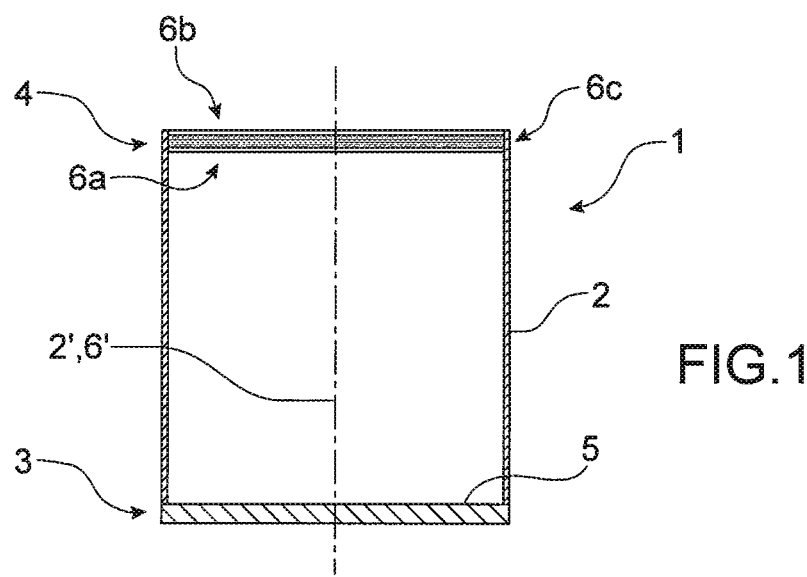
FIG. 1 shows a vertical section of a container in accordance with the invention, wherein its upper opening is closed by an inserted blocking member, forming a lid.

The container 1, shown in FIG. 1, is adapted in particular to waste which have a tendency to take on or take back volume over the course of time. This container 1 is as such dedicated very particularly to the packaging of a superposition of compressed cakes of radioactive waste. As shown in this FIG. 1, the container 1 has the general shape of a cylindrical drum. It is comprised of a cylindrical side wall 2 of which the two end edges, lower 3 and upper 4, are each provided with a circular blocking member 5 and 6, the lower one forming a bottom member and the other upper one forming a lid. Here, the bottom member 5 is fixed irremovably to the side wall 2, for example by welding or crimping. The lid member 6 is of the inserted type. It comprises two faces: one interior 6a and the other exterior 6b, connected by a peripheral outline 6c. This lid 6 comes to block the upper opening 7 of the container 1 (visible in FIG. 2 or 4), which is defined by the upper edge 4 of the side wall 2; as developed in what follows, the filling of the container 2 with the waste to be packaged and stored is carried out through this upper opening 7, before this lid 6 is set into place. The various parts of the container 1 are made of a metal material, for example of steel, but they could alternatively be made of any other material selected according to environmental or operating constraints. The dimensions and thicknesses of these portions of the container 1 can be adapted as desired by those skilled in the art.

Figure 2:
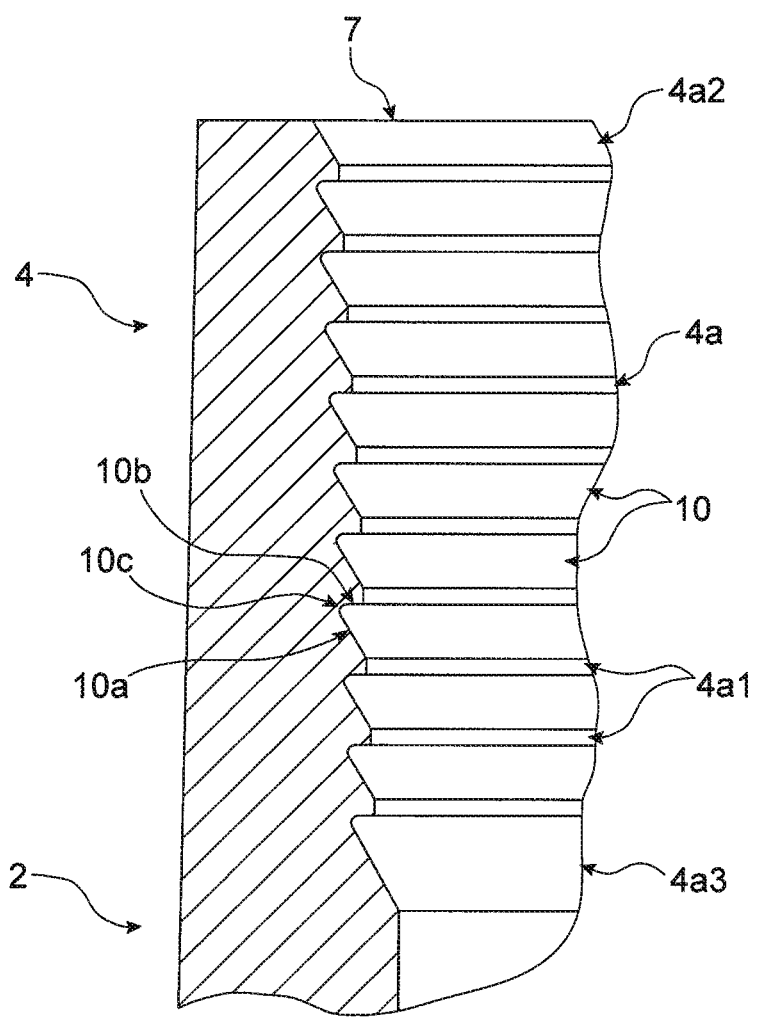
FIG. 2 is a detailed view of the container of FIG. 1, showing in an enlarged manner and as a cross-section the shape of the upper end edge free from its side wall.
Figure 3:
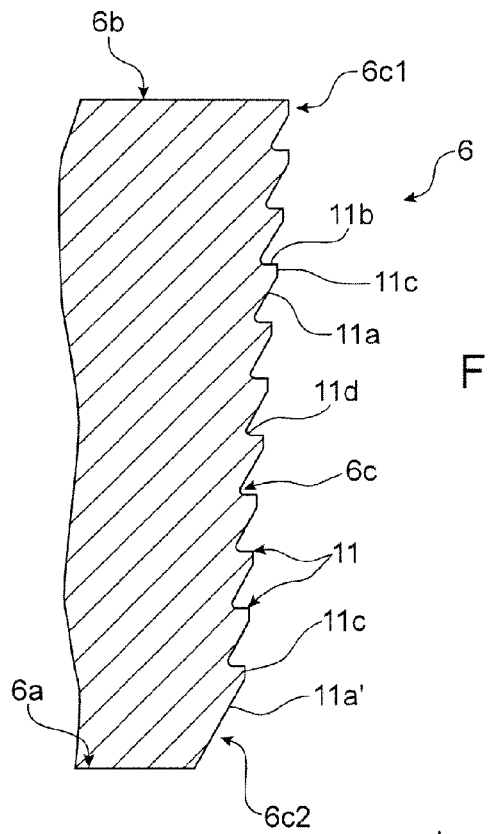
FIG. 3 shows, in an enlarged manner, another detail of the container of FIG. 1, i.e. a section of the peripheral outline of its inserted blocking member.

Particular structural means for linking are here provided between the inserted lid 6 and the upper edge 4 of the side wall 2. These means for linking are particularly adapted to the packaging of radioactive waste. These make possible indeed a closing of the opening 7 of the container 1 with the lid 6, these two members 1, 6 then being maintained associated by a very safe positive connection system, resisting a thrust force for example of a magnitude of several tens of tonnes (the compressed cakes of waste act as springs) and this with a very good safety factor. For this, on the one hand, as shown in FIGS. 2 and 3, the peripheral outline 6c of the inserted blocking member 6 and the interior outline 4a of the upper edge 4 of the side wall 2 have generally complementary tapered shapes. As shown in FIGS. 1 and 4, the inserted blocking member 6 then comes to be housed and fits (here over its entire height) in the space defined by the interior outline 4a of the upper edge 4 (defining the filling opening 7 as mentioned before) and comes to bear against this interior outline 4a. On the other hand, the peripheral outline 6c of the inserted blocking member 6 and the interior outline 4a of the upper end edge 4 of the side wall 2, are provided with a set of protruding lugs and complementary recesses extending over their respective circumferences. The number of lug/recess pairs is adapted according in particular to the forces to be retained. These lugs and complementary recesses, forming the structural means for linking properly speaking, are able to nest for the positive and passive locking of said blocking member 6 press fitted to the side wall 2. More precisely, as shown in FIG. 2, the interior outline 4a of the upper edge 4 of the side wall 2 is provided over its height of a set of annular parallel and successive recesses 10, here in the number of ten, forming together a toothed section or a so-called "artillery pitch" (with dissymmetric threads) profile. These annular recesses 10 each extend, on the one hand, over the entire circumference of the interior outline 4a and on the other hand, in a plane perpendicular to the axis 2' of the side wall 2. Each of these annular recesses 10 has a section of generally triangular shape, open in the direction of the axis 2', which comprises an inclined annular surface 10a followed by an annular surface 10b forming a shoulder; these two surfaces 10a and 10b are here connected by an annular junction surface 10c, of radiated section. The inclined annular surface 10a, is directed upwards (i.e. towards the exterior of the container) and moves away from the axis 2' of the side wall 2, from the bottom to the top (i.e. again from the interior to the exterior); the annular shoulder 10b is directed towards the lower edge 3 of the side wall 2 (i.e. towards the interior of the container) and extends in a plane perpendicular to the axis 2' of the side wall 2. Two successive annular recesses 10 of the upper edge 4 are separated here by an annular portion 4a1 from this interior outline 4a. These annular portions 4a1 extend here each perpendicularly to the axis 2' of the side wall 2. The recesses 10 and the successive annular portions 4a1 have an offset towards the periphery in relation to the axis 2', this from the bottom to the top in FIG. 2 (i.e. again from the interior to the exterior of the container); the annular portions 4a1 together define the interior outline 4a properly speaking of generally tapered shape, diverging from the bottom to the top. With regards to the recesses 10, the inclined surface 10 extends according to an angle between 20° and 40° in relation to the axis 2' of the wall 2. The width of the shoulder surface 10b is between 5 mm and 10 mm. The annular portions 4a1 have a height between 5 mm and 10 mm. The radius of these portions 4a1 increases successively and regularly from the bottom to the top; the interior outline 4a defined as such delimits a truncated cone. As shown again in FIG. 2, the free upper end 4a2 of the interior outline 4a has a generally annular tapered shape, diverging from the bottom to the top. The recess 10 located on the lower end 4a3 comprises an inclined annular surface 10a', of which the height is greater than the other recesses 10 in order to recover the inside diameter of the side wall 2. On the other hand, as shown in FIG. 3, the peripheral outline 6c of the inserted blocking member 6 is provided over its height with a succession of annular lugs 11 parallel to one another, here in the number of eleven, extending over its entire circumference and each in a plane perpendicular to its axis 6'. The annular lugs 11 form annular catches, which are adjoining in relation to one another over the height of the peripheral outline 6c. They together form a peripheral profile of generally tapered shape of which the section has the general shape of a rack or of a so-called "artillery pitch" profile. These lugs 11 are complementary to the recesses 10 described hereinabove in relation with FIG. 2. They each have for this a generally triangular shape formed of an inclined surface 11a, directed on the side of the interior face 6a and moving away from the axis 6' in the direction from the interior face 6a to the exterior face 6b, followed by a surface 11b forming a flat, directed to the exterior face 6b side and extending perpendicularly in relation to the axis 6' of the blocking member 6. These lugs 11 further each comprise a peripheral ridge 11c (connecting the aforementioned surfaces 11a and 11b), here of generally annular shape and extending in parallel to the axis 6' of the blocking member 6. Two successive lugs 11 are further connected by an annular surface 11d, here with a section in the arc of a circle or with radius. These annular surfaces 11 form and delimit together the peripheral outline 6c properly speaking of the blocking member 6. The successive lugs 11 are offset towards the periphery, from the bottom to the top; their annular ridges 11c then together define a space of generally tapered shape, diverging from the interior face 6a to the exterior face 6b. These lugs 11 have shapes and dimensions which correspond, after allowing for clearance, to those of the recesses 10 described hereinabove in relation with FIG. 2. The inclined surface 11a extends according to an angle (the same angle as the inclined surface 10 after allowing for clearance) between 20° and 40° in relation to the axis 6' of the blocking member 6; its flat 11b has a width between 5 and 10 mm. In addition, the radius of each ridge 11c increases successively, from the bottom to the top, between 1 and 3 mm. As for the recesses 10, the lugs 19 have, in this type of embodiment, protruding portions (the peripheral ridges 11c, or the interior outlines 4a) of which the successive radiuses in progression from 20% to 50% of the widths of the flats 11b or of the shoulders 10b.

As such, the ridges 11c of the successive lugs 11 together define a space in the shape of a truncated cone diverging from its interior face 6a towards its exterior face 6b. Moreover, the lug 11 located on the side of the lower end 6c2 of the peripheral outline 6c comprises an inclined surface 11a' that is longer than that of the other lugs 11, in order to facilitate the fitting of the blocking member 6 on the side wall 2, as detailed in what follows in relation with FIG. 4. Likewise, the peripheral ridge 11c of this lug 11 located on the side of the interior face 6a has a radius which is less than that of the upper end 4a2 of the internal outline 4a of the side wall 2, in particular to limit the contacts between the lugs 11 and the internal outline 4a of the side wall 2 during the nesting operation described in what follows. Here, during the nesting operation, the lugs 11 of the blocking member 6 are normally able to come into contact with a maximum of two to four annular portions 4a1 of the internal outline 4a, before their positioning in their final reception recess 10. Before it is put into place, this lid 6 can be treated superficially, for example by tempering, in order to obtain a superficial hardness that is greater than that of the upper end 4 of the side wall 2, and as such prevent a gripping during the fitting operation described hereinafter.

The setting in place of the blocking member 6 in the upper end 4 of the side wall 2 is carried out by fitting or axial joining by means of a press 15, advantageously according to the steps in the kinematics (A, B, C) shown in FIG. 4. The mounting press 15 in question is comprised of a base 16, whereon the container 1 comes to position itself, a compacting skirt 17 for maintaining in place this inserted container 1, and a cylinder (not shown) of which the end of the rod 18 is provided with means 19 able to carry the blocking member 6. This press 15 is further provided with a set of means for manoeuvring and guiding the cylinder (not shown). In practice, as shown in FIG. 4A, the container 1 is placed on the base 16, with its filling opening 7 directed upwards, and the compacting skirt 17 is placed around the side wall 2 of this container 1. The container 1 is filled with the radioactive waste, either prior to its positioning within the press 15, or once in place in this press. In parallel, the blocking member 6 is mounted on means for maintaining 19 of the cylinder, i.e. across from the opening 7 of the container 1 and coaxially to the latter (still in FIG. 4A).

The waste to be compressed and compacted has been shown. This can be cakes 20 resulting from a pre-compression and a flattening of metal drums wherein the waste had been poured in bulk. The compacting skirt 17 has a height that is sufficient above to contain the top of the stack of cakes 20, outside of said side wall 2. Then, the cylinder rod 18 is manoeuvred axially in the direction of the bottom member 5 of the container 1, in such a way that the blocking member 6 comes to be arranged and fit into the space defined by the upper edge 4 of the container 1 (as shown in FIG. 4B).

The cylinder 18 compresses at the same time the pile of cakes 20 and makes it enter completely the container 1 by ensuring an excellent fill rate of the latter.

Figure 5:
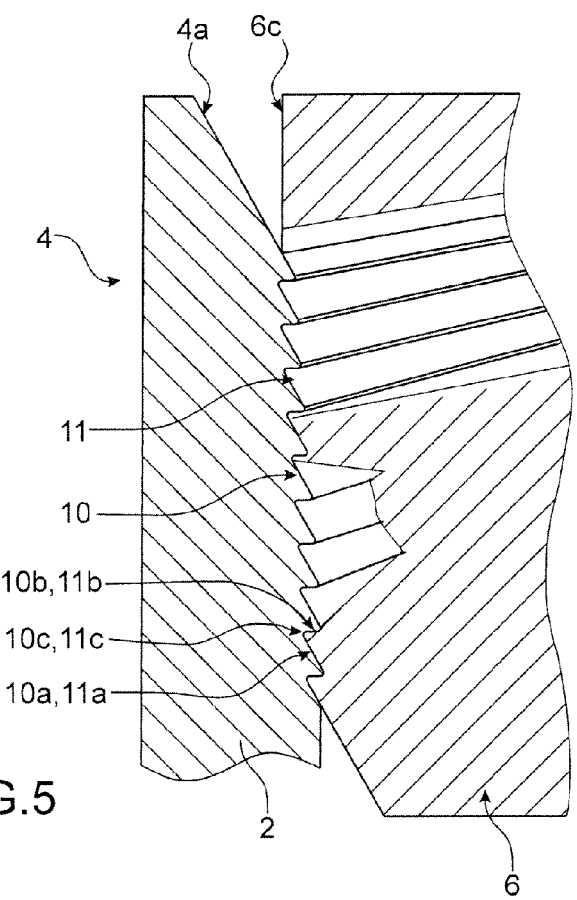
FIG. 5 shows, by means of an enlarged section and in detail, an alternative of the structure of the means for linking between the blocking member and the upper end edge of the side wall.

The blocking member 6 is manoeuvred until a final position which is defined advantageously by a mechanical stop corresponding to the bearing of the cylinder on the top container; in practice, this final position corresponds, on the one hand, to the bearing between the outlines 4a and 6c of the side wall 2 and of the blocking member 6, and on the other hand, to the cooperation of all of the recesses 10/lugs 11. The particular shape of all of the recesses 10/lugs 11 participates in optimising this positioning by the fitting of the lid 6 on the container 1. During its manoeuvre in axial translation, the blocking member 6 may be used to press and compact the products introduced into the container 1. In the framework of the fitting referred to as "cold" or "forced", the upper edge 4 of the side wall 2 undergoes an elastic deformation during the positioning of the lid 6 which ensures in the end the holding of the lugs 11 within the recesses 10 of the side wall 2. In this case, the friction and seizing of the lugs 11 with the upper edge 4 of the side wall 2 are limited by the inclined surfaces 11a of these lugs 11. Once the blocking member 6 is suitably fitted (as shown in FIG. 4b), the means for maintaining 19 can be unfastened from the blocking member 6, and the compacting skirt 17 can be raised, as such releasing the closed container 1 wherein the packaged products are maintained in a compressed state. The inserted blocking member 6 is maintained in place on the upper edge 4 of the side wall 2 via the contact of the flats 11b of the lugs 11 against the shoulders 10b of the recesses 10. An alternative embodiment for the outlines contours across from 4a and 6c of the side wall 2 and of the blocking member 6 is shown in FIG. 5. These outlines 4a, 6c are very similar to those described hereinabove in relation with FIGS. 1 to 3, and are distinguished only by the fact that they have generally cylindrical complementary shapes (instead of the complementary tapered shapes of the embodiment of FIGS. 1 to 3). This shape of the means for linking between the side wall 2 and the blocking member 6 has in particular the interest of allowing for the centering of the blocking member 6 on the container 1 in the case where the means of guiding the mounting press are relatively wide. In order to be complete, still in an alternative manner, the peripheral outline 6c of the blocking member 6, of generally cylindrical or tapered shape, can be provided over its height with a lug of generally helicoidal shape, of which the peripheral ridge also extends in a space of generally cylindrical or tapered shape. In this case, this helicoidal lug cooperates with an additional recess which is also helicoidal, arranged on the upper end edge 4 of the side wall 2. This type of lid 6 with helicoidal lug is set in place via axial translation, as described hereinabove in relation with FIG. 4, in such a way as to exert an compression optimal force on the disposed products. Still in this case, the blocking member 6 and the side wall 2 are advantageously provided with markings in order to allow for a correct angular positioning between them, thus providing the correct and complete positioning of the helicoidal lug in its reception recess. Generally and for all cases, the number and the dimensions of the recesses and lugs are adapted according to the stresses that the blocking member 6 will undergo, and in particular of the intensity of the thrust forces exerted by the packaged products. Still generally, the bottom member 5 could have a structure that is identical or similar to that described hereinabove in relation with FIG. 3. The lower edge 3 of the side wall 2 would then be similar or identical to the upper edge 4 described hereinabove in relation with FIG. 2. In the case of an aggressive or liquid content, the lower end 6c2 of the peripheral outline of the blocking member 6 can further be provided with a rubber O-ring seal in order to ensure the seal of the container and in order to protect the lugs/recesses unit. Still generally, the blocking member 6 can have, before it is mounted, a general cup or domed shape, this dome intended to be directed to the side of its interior face 6a. Once inserted on the container 1, this blocking member 6 undergoes a straightening and deformation phenomenon towards a flat shape, under the thrust force exerted by the packaged products, causing an increase in the diameter of its peripheral outline 6c and optimising the lug(s) 11/recess(s) 10 cooperation.

Figure 6:
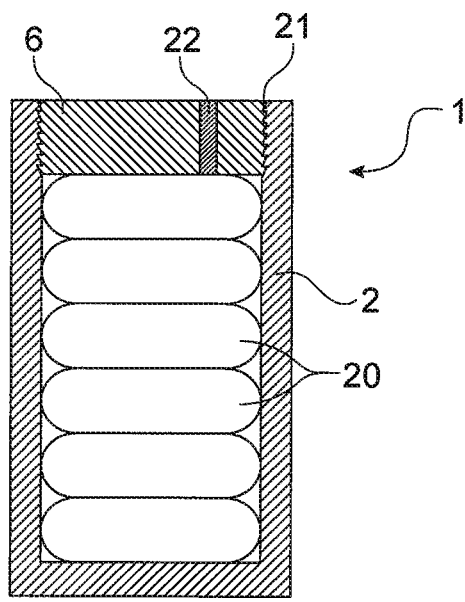
FIG. 6 shows the gas-permeable device.

The description now concerns FIG. 6. The blocking member 6 can be welded to the side face 2 by a back strip 21 at their junction. In addition, a breathing pellet 22, which can consist of a crossing through porous material, equips the blocking member 6 (or the side face 2). These arrangements can be used if the degassing via radiolysis of the container 1 must be measured or examined in another way, because it is then concentrated at the location of the pellet 22 and therefore easy to control.

FIG. 7 shall now be described. The container 1 filled with cakes 20 and closed can be arranged in an external container 23 such as a storage package temporarily or definitively. The external container 23 can be with a metal shell 27 and with a concrete layer of radiological confinement 28, for example and comprised of a main hollow portion 24 and of a lid 25. It is not hermetically sealed but on the contrary allows for the evacuation of the gases coming from the cakes 20 and which have crossed the container 1. The gases can pass through specially-arranged portions 26 that are provided either on the main portion 24 or the lid 25 and further comprise breathing pellets, porous portions, or labyrinth drilling for example. The container 1 can be housed in the cavity of the external container 23 with little play since its dimensions are perfectly known and are invariable in such a way that there remains little empty volume. The lid 25 is welded to the main portion 24 at their junction 29 once the container 1 has been set into place.

The invention claimed is:

1. Container in the form of a drum for stabilising and confining solid waste comprising a side wall with lower and upper end edges each provided with a blocking member, at least one of said two blocking members being of the inserted type in order to close an opening defined by the associated end edge, said inserted blocking member-comprising two faces, one interior and the other exterior, connected by a peripheral outline, peripheral outline of the inserted blocking member and an interior outline of the associated end edge of the side wall having generally complementary shapes on at least one portion of their respective heights, in such a way that said inserted blocking member comes to be housed on at least one portion of its height in a space surrounded by said end edge of the side wall and comes to bear against said end edge, characterised in that peripheral outline of the inserted blocking member is provided with at least one protruding lug and extending over its circumference, which has a section of generally triangular shape formed of an inclined surface, directed towards the interior face with an inclination such that said inclined surface moves away from a central axis of said blocking member in a direction from the interior face to the exterior face according to an angle between 20° and 40° in relation to said axis, followed by a surface forming a flat, directed towards the exterior face, and in that the interior outline of the end edge of the side wall has at least one recess extending also over its circumference, able to receive said lug in order to ensure a locking of said inserted blocking member on said side wall, the recess having a section comprising an inclined surface, directed towards the exterior of the container with an inclination such that said inclined surface moves away from a central axis of said side wall in an interior towards the exterior direction according to an angle between 20° and 40° in relation to said axis, followed by a surface forming a shoulder, directed towards the interior of the container.

2. Container according to claim 1, characterised in that the surface forming a flat of the protruding lug of the inserted blocking member extends in a plane perpendicular to the axis of said blocking member, and in that the surface forming a shoulder of the recess of the end edge of the side wall extends in a plane perpendicular to the axis of the side wall.

3. Container according to claim 1, characterised in that it comprises a plurality of said lugs and a plurality of said recesses, the plurality of lugs and the plurality of recesses being superimposed in the direction of the axis of the blocking member or of the axis of the side wall.

4. Container according to claim 3, characterised in that the plurality of lugs and the plurality of recesses are all annular and parallel.

5. Container according to claim 3, characterised in that the plurality of lugs are successive spires of a helicoidal lug, and the plurality of recesses are successive spires of a helicoidal recess.

6. Container according to claim 3, characterised in that the complementary outlines of the inserted blocking member and of the side wall have generally complementary tapered shapes over at least one portion of their respective heights, said tapered portion of the blocking member diverging in the direction from the interior face to the exterior face and said tapered portion of the side wall diverging in the direction from the interior to the exterior of the container, the plurality of lugs having peripheral ridges with different increasing radiuses from the interior face to the exterior face, and the plurality of recesses are separated by interior outlines also of different radiuses, increasing from the exterior of the container.

7. Container according to claim 6, characterised in that the radiuses of some of the interior outlines are larger than the radiuses of some of the ridges of the plurality of lugs.

8. Container according to claim 6, characterised in that the radiuses of the interior outlines and of the peripheral ridges are successively increasing at a rate of 20% to 50% of the widths of the flats or of the shoulders.

9. Container according to claim 3, characterised in that the plurality of lugs are adjoining in relation to one another, the surfaces forming a flat alternating directly with the inclined surfaces.

10. Container according to claim 1, characterised in that the inclined surface of the lug is harder than the inclined surface of the recess.

11. Method for stabilising and confining products such as radioactive waste in a container according to claim 1, characterised in that it consists:
- in filling the container via its filling opening, with said products;
- in inserting said blocking member of the inserted type across from said filling opening,
- in applying a compression force on said products by exerting a force on said inserted blocking member, coaxially to the side wall and in the direction of its other blocking member, until the complementary outlines of said inserted blocking member and of the side wall bear against one another, in such a way as to compress said products and to ensure the locking of said inserted blocking member on said side wall by the nesting of the lug in the recess.

12. Method according to claim 11, characterised in that, prior to its positioning, the inserted blocking member has a general shape of a cup, its dome being directed towards the side of its interior face, and in that, once inserted, said blocking member undergoes a straightening and deformation phenomenon towards a flat shape, under the thrust force exerted by the products, causing an increase in the diameter of its peripheral outline and improving the nesting of the lug in the recess.

13. Method according to claim 11, characterised in that it comprises a step of welding the blocking member to the side wall, the container being crossed by a breathing pellet, gas-permeable.

14. Method according to claim 11, characterised in that it comprises a step of enclosing of the container, which is made of metal, in an external container having a radiological confinement shell.

15. Method according to claim 14, characterised in that, the external container comprising a main portion and a lid, and a respiration portion, the lid is welded to the main portion.

* * * * *